Dec. 11, 1945.  B. F. LANGER  2,390,797
INDICATING SYSTEM
Filed Nov. 19, 1942
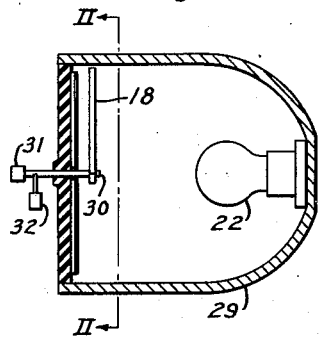
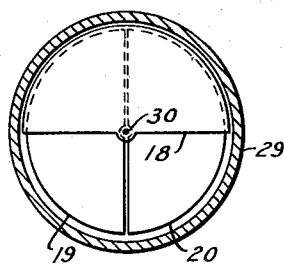
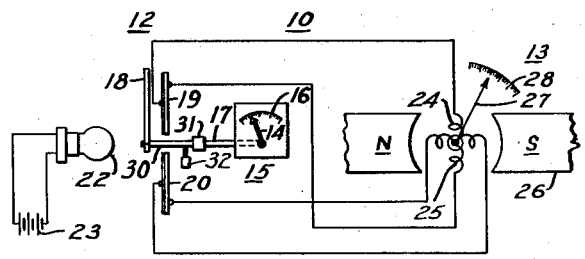
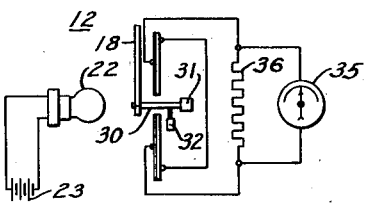
WITNESSES:
INVENTOR
Bernard F. Langer.
BY
ATTORNEY Patented Dec. 11, 1945

2,390,797

UNITED STATES PATENT OFFICE 2,390,797

INDICATING SYSTEM

Bernard F. Langer, Pittsburgh, Pa., assignor to Westinghouse Electric Corporation, East Pittsburgh, Pa., a corporation of Pennsylvania Application November 19, 1942, Serial No. 466,144

7 Claims. (Cl. 177—351)

My invention relates generally to indicating systems and it has reference in particular to remote position indicating systems.

Generally stated, it is an object of my invention to provide for remote indication of the position of a moving element in a manner which is both simple and inexpensive.

More specifically, it is an object of my invention to provide for repeating at remote locations the reading of an indicating instrument where alternating current for synchro tie systems is not available.

It is also an object of my invention to provide for indicating remotely the position of a movable element by varying inversely the illumination of a pair of photoelectric devices in response to movement of the element, and operating a remote indicating instrument in accordance with the differential between the outputs of the devices.

Another object of the invention is to provide a direct current position indicating system which is simple and effective.

Yet another object of my invention is to provide for utilizing a ratio type electric indicating instrument in connection with a pair of photoelectric devices while varying the illumination of the devices in response to movement of a movable element, so that the ratio type instrument indicates the position of the movable element.

A further object of my invention is to provide for utilizing a plurality of photoelectric elements for controlling the operation of a remote indicator in response to movement of a movable member of which a position indication is desired.

Other objects will in part be obvious, and will in part be explained hereinafter.

According to my invention an indication of the position of a moving element such as the pointer on an instrument may be repeated at a remote location by utilizing a pair of radiation responsive elements and varying inversely the areas thereof exposed to radiations from a source by means of a movable baffle actuated by the moving element. The opposed operating windings of a ratio type instrument are so connected to the radiation responsive elements that the indicating hand of the instrument moves to a position corresponding to the position of the moving element.

For a more complete understanding of the nature and scope of my invention reference may be had to the accompanying drawing in which:

Figure 1 is a side elevational view, in section, of position indicator transmitter embodying the principal features of the invention.

Fig. 2 is a sectional view taken along the line II—II of Fig. 1;

Fig. 3 represents diagrammatically a position indicating system embodying the invention; and Fig. 4 represents diagrammatically a modified position indicating system embodying the invention.

Referring to Fig. 3 the reference numeral 10 may denote, generally, a remote indicating system wherein a transmitting device 12 may be used for controlling the operation of an indicating instrument 13 in order to give a remote indication of the position of a movable element, such as a valve handle or the pointer 14 of an electrical indicating instrument 15, which moves over a scale 16.

The moving element or pointer 14 of the indicating instrument 15 may be operatively connected by means of a shaft 17 to a baffle 18 interposed between a pair of radiation responsive devices or elements 19, 20, and a source of radiation such as the lamp 22. The radiation responsive devices may be of any suitable nature comprising, for example, copper-oxide or selenium photoelectric cells of a type well known in the art. The lamp 22 may be connected to any suitable source such as, for example, the battery at 23.

The indicating instrument 13 may be of any suitable type being for example, of the ratio type, having opposed moving operating windings 24 and 25 positioned between the poles of a permanent magnet 26 for operating a pointer 27 over a scale 28.

As shown in Figs. 1 and 2, the radiation responsive devices 19 and 20 may be of any suitable shape, being for example, generally semi-circular in shape, and may be arranged in substantially a circle adjacent one end of a suitable housing 29 with their diametrical edges substantially vertical. The lamp 22 may be mounted in any suitable manner adjacent the other end of the housing. In order to vary the illumination of the radiation responsive devices 19 and 20 in a proper manner to utilize them for transmitting remote indications of position, the baffle 18 may also be suitably shaped, being for instance, generally semi-circular in shape, and may be rotatably mounted about the mid-point of the diametrical edge by means of a shaft 30 positioned substantially centrally of the radiation responsive devices. Means such as the coupling 31 may be provided for connecting the shaft 30 to the shaft 17. Means, such as the counterweight 32, may be used to balance the baffle 18 in order to neutralize the effect of gravity thereon.

The opposed operating windings 24 and 25 of the indicating instrument 13 may be so connected to the radiation responsive devices 19 and 20 that the position of the pointer 27 is determined by the ratio between the current in these coils. Thus the position of the pointer 27 is in effect determined by the ratios of the voltages generated by the elements 19 and 20. Since these voltages are proportional to the areas of the elements exposed to the lamp 22, they are in effect determined by the position of the baffle 18 within a range of from 0 to about 180°. Thus as the pointer 14 of the indicating instrument 15 moves from one position to another, the ratio between the uncovered or exposed areas of the elements 19 and 20 varies accordingly, so that the pointer 27 always occupies a position corresponding to the position of the pointer 14.

Referring to Fig. 4 it will be seen that the radiation responsive elements 19 and 20 of the transmitter 12 may, instead of being connected to an indicating instrument of the ratio type as in Fig. 3, be connected in opposition in series circuit relation with a current measuring device such as the micro-ammeter 35. The micro-ammeter 35 may be connected in series with the elements 19 and 20, or a control resistor 36 may be provided, either in series or shunt with the microammeter to control the sensitivity of the meter.

The meter indicates the current flowing in response to the differential between the voltages of the radiation responsive elements. Since the voltages generated by the elements are proportional to the exposed areas of the elements, the differential thereof will be a measure of the ratio of the output voltages and the meter 35 may be used to indicate the relative position of the baffle 18, and of the moving element connected thereto by means of shaft 16.

From the above description and the accompanying drawing it will be apparent that I have provided in a simple and effective manner for indicating the instantaneous position of a moving element such as the hand of an electrical instrument, a valve wheel, or the like at a remote position without requiring the use of alternating currents. The system of my invention utilizes comparatively simple and inexpensive apparatus which is reliable in operation.

Very little torque is required to operate the transmitting device of my invention, only enough to overcome bearing friction. This is of great advantage when the device is used for remotely indicating meters or instrument readings. When used with a ratio type meter or instrument, the accuracy of the transmitting device is entirely unaffected by variations in the intensity of the light source or aging of the photo-electric elements. This makes for an accurate and reliable indication of position.

Since certain changes may be made in the above described apparatus and different embodiments of the invention may be made without departing from the spirit or scope thereof, it is intended that all the matter contained in the above description or shown in the accompanying drawing shall be considered as illustrative and not in a limiting sense.

I claim as my invention:

1. A position indicating system for producing at a remote location an indication of the operating condition of a device having a moving element comprising, a plurality of stationary radiation responsive devices positioned in spaced side by side relation, an associated source of radiation for the devices, a movable opaque baffle actuable in response to movement of the moving element to vary the areas of the radiation responsive devices exposed to radiations simultaneously in opposite senses, indicating means positioned at the remote location, and circuit means so connecting the radiation responsive devices to the indicating means that said means operates in response to the resultant of the opposed outputs of the devices to indicate the position of the moving element.

2. A remote indicating system for an indicating instrument having a movable element comprising, a pair of radiation responsive devices positioned in side by side relation with substantial portions of the areas thereof in juxtaposition, a source of radiation for the devices, a movable opaque baffle pivotally mounted between the devices and actuable in accordance with movements of the moving element to vary simultaneously the radiation from the source on the devices inversely, and indicating means responsive to the resultant of the outputs of the radiation responsive devices for indicating a departure from a balanced condition and operating in accordance with movement of the moving element.

3. The combination with a device having a movable element, of a pair of photoelectric cells arranged in side by side relation, a light source, an opaque baffle movable relative to the cells in response to movement of the movable element to vary the photoelectric effects of the cells in opposite senses, indicating means having a pair of relatively fixed movable operating windings, and circuit means connecting the photoelectric cells and the operating windings of the indicating means for operating the indicating means in accordance with a difference between the outputs of the cells.

4. The combination with an instrument having a pivoted indicator, of a pair of juxtaposed radiation responsive devices substantially semi-circular in shape arranged to form a circle, a source of radiation, a substantially semi-circular baffle positioned intermediate the source and the devices arranged to be rotated in response to movement of the indicator from one position to another to vary the radiation from the source on the devices in opposite senses, and a remotely positioned instrument having a pair of electrically independent operating windings connected separately to different of the radiation responsive devices to be responsive to the ratio between the outputs of the devices in opposed relation for giving an indication of the position of the first-mentioned instrument substantially independent of ageing of the radiation responsive devices.

5. Remote indicating means for an instrument having a pivoted element comprising, a pair of juxtaposed photoelectric devices substantially semi-circular in shape arranged in substantially a circle, a source of light, a substantially semicircular baffle positioned between the source and the devices and pivotal about an axis intermediate the devices in response to movement of the pivoted element to vary the radiations from the source on the devices in opposite senses, and an indicating instrument having a pair of angularly related movable operating windings so connected to the devices as to give an indication in accordance with the ratio between the outputs thereof which is similar to the first-mentioned instrument.

6. The combination with an indicating instrument at a sending station having a moving element, of position transmitting means comprising a pair of substantially semi-circular photoelectric elements arranged to form substantially a circle, a light source, a substantially semi-circular baffle positioned between the photoelectric elements and the source rotatable in response to movement of the moving element about an axis substantially central of the circle formed by the photoelectric elements, a ratio type instrument at a receiving station having similar angularly related operating windings for operating an indicating pointer in opposite senses connected to the photoelectric elements for operating the pointer in accordance with the ratio of the values of the outputs of the photoelectric elements to indicate different positions of the indicating instrument at the sending station.

7. A remote indicating system for a local instrument having a moving element comprising, a pair of substantially semi-circular photoelectric elements arranged in substantially a circle, a light source, a substantially semi-circular baffle positioned between the photoelectric elements and the source and mounted on a shaft substantially coaxial with the axis of the circle, said shaft being actuable in response to movement of the moving element, a remotely located ratio type indicating instrument having relatively fixed angularly related operating windings, and circuit means connecting the photoelectric elements to different of the windings to operate the remote instrument to indicate the position of the moving element of the local instrument.

BERNARD F. LANGER.